(12) United States Patent
Ohrn et al.

(10) Patent No.: US 11,225,011 B2
(45) Date of Patent: Jan. 18, 2022

(54) NET REPLACEMENT FILM (71) Applicant: TRIOPLAST AB, Smalandsstenar (SE)

(72) Inventors: Lars Ohrn, Molndal (SE); Inger Bystrom, Smalandsstenar (SE); Torbjorn Runesson, Smalandsstenar (SE); Andreas Lindberg, Degeberga (SE)

(73) Assignee: Trioplast AB, Smalandsstenar (SE)

( * ) Notice: Subject to any disclaimer, the term of this patent is extended or adjusted under 35 U.S.C. 154(b) by 392 days.

(21) Appl. No.: 15/938,634

(22) Filed: Mar. 28, 2018

(65) Prior Publication Data
US 2018/0215089 A1 Aug. 2, 2018

Related U.S. Application Data

(62) Division of application No. 13/516,095, filed as application No. PCT/EP2010/070135 on Dec. 17, 2010, now abandoned.

(30) Foreign Application Priority Data

Dec. 21, 2009 (EP) ..................... 09180184

(51) Int. Cl.
*B29C 55/06* (2006.01)
*A01F 15/07* (2006.01)
(Continued)

(52) U.S. Cl.
CPC .......... *B29C 55/06* (2013.01); *A01F 15/0715* (2013.01); *A01F 2015/0745* (2013.01);
(Continued)

(58) Field of Classification Search
CPC ................ B29C 55/06; A01F 15/0715; A01F 2015/0745; B29K 2023/0625; B29K 2023/083; B29K 2423/083
See application file for complete search history.

(56) References Cited

U.S. PATENT DOCUMENTS 4,293,508 A * 10/1981 Heirbaut ............... B05C 9/14
  26/106
4,387,552 A * 6/1983 Lancaster ............ A01F 15/071
  53/211

(Continued)

FOREIGN PATENT DOCUMENTS

EP  0531021 A1  3/1993
EP  1015228 A1  7/2000

(Continued)

OTHER PUBLICATIONS

Notice of Opposition against Australian Patent Application No. 2010335202 dated Mar. 5, 2014.
Notice of Opposition against New Zealand Patent Application No. 601309 dated Aug. 29, 2014.

(Continued)

*Primary Examiner* — Robert F Long
*Assistant Examiner* — Eduardo R Ferrero
(74) *Attorney, Agent, or Firm* — Harness, Dickey & Pierce, P.L.C.

(57) ABSTRACT

The present invention relates to a prestretched polyethylene film having a longitudinal stretch ratio of from about 1:2 to about 1:4 and having a longitudinal elongation capability of at least 170%, said elongation capability comprising an elastic component. The invention also relates to a method for producing said film and to a method of wrapping compressed bulk material such as a round bale using said film, the method comprising further stretching the prestretched film and applying the film around the compressed bulk material in direct contact therewith. The film according to the invention may be used as a net replacement film and allows increasing the efficiency and the economics in the baling process by allowing faster baling, use of a lesser amount of wrapping film and/or improved protection of the product.

21 Claims, 4 Drawing Sheets (51) Int. Cl.
*B29K 23/00* (2006.01)
*B29K 423/00* (2006.01)

(52) U.S. Cl.
CPC .............. *B29K 2023/0625* (2013.01); *B29K 2023/083* (2013.01); *B29K 2423/083* (2013.01)

(56) References Cited

U.S. PATENT DOCUMENTS

| | | | | |
|---|---|---|---|---|
| 4,503,658 | A * | 3/1985 | Mouser | B65B 11/045 53/399 |
| 4,569,439 | A * | 2/1986 | Freye | A01F 15/0715 100/15 |
| 4,629,525 | A | 12/1986 | Rasmussen | |
| 4,779,526 | A * | 10/1988 | Frerich | A01F 15/0715 100/5 |
| 4,781,291 | A * | 11/1988 | VanGinhoven | A01F 15/071 206/83.5 |
| 4,813,348 | A * | 3/1989 | Frerich | A01F 15/0715 100/5 |
| 4,841,716 | A * | 6/1989 | Roymberg | B65B 11/045 53/556 |
| 5,079,898 | A * | 1/1992 | Springs | A01F 15/141 53/389.3 |
| 5,203,139 | A * | 4/1993 | Salsburg | B65B 11/04 53/118 |
| 5,311,729 | A * | 5/1994 | Viaud | A01F 15/0715 100/88 |
| 5,433,059 | A * | 7/1995 | Kluver | A01F 15/0715 53/118 |
| 5,628,167 | A * | 5/1997 | Huson | B65B 11/04 53/210 |
| 5,797,246 | A * | 8/1998 | Martin-Cocher | B29C 55/06 53/399 |
| 5,930,980 | A * | 8/1999 | Madsen | A01F 15/0715 53/118 |
| 5,935,681 | A | 8/1999 | Paulett | |
| 5,996,307 | A * | 12/1999 | Niemerg | A01F 15/0715 53/118 |
| 5,998,017 | A * | 12/1999 | Eichbauer | B32B 27/32 428/343 |
| 6,070,393 | A * | 6/2000 | Martin-Cocher | B29C 55/06 53/441 |
| 6,083,611 | A * | 7/2000 | Eichbauer | B32B 27/32 428/213 |
| 6,093,480 | A * | 7/2000 | Eichbauer | B32B 27/32 428/213 |
| RE38,429 | E * | 2/2004 | Eichbauer | B32B 27/32 428/213 |
| 6,971,220 | B1 * | 12/2005 | Rampp | A01F 15/071 53/216 |
| 2001/0014401 | A1 | 8/2001 | Bonke et al. | |
| 2003/0118853 | A1 | 6/2003 | Cook et al. | |
| 2004/0132854 | A1 | 7/2004 | Du Plessis et al. | |
| 2005/0170194 | A1 | 8/2005 | Breese | |
| 2005/0210854 | A1 * | 9/2005 | McClure | A01F 15/0715 56/341 |
| 2006/0243842 | A1 | 11/2006 | Saldana Garcia | |
| 2007/0134478 | A1 | 6/2007 | Haberer et al. | |
| 2009/0131618 | A1 * | 5/2009 | Santillan Diaz de Leon | B29C 55/023 526/348.1 |
| 2009/0192270 | A1 | 7/2009 | Malakoff et al. | |
| 2009/0269566 | A1 | 10/2009 | Eichbauer et al. | |
| 2010/0129632 | A1 * | 5/2010 | Eichbauer | B32B 7/02 428/220 |
| 2010/0139211 | A1 * | 6/2010 | Moore | B65H 54/62 53/204 |
| 2010/0205910 | A1 * | 8/2010 | Huyghe | B32B 27/08 53/441 |
| 2013/0032046 | A1 * | 2/2013 | Ohm | A01F 15/0715 100/40 |
| 2013/0168485 | A1 * | 7/2013 | Balzanelli | B65H 54/62 242/472.5 |
| 2019/0001649 | A1 * | 1/2019 | Mattsson | B32B 27/32 |

FOREIGN PATENT DOCUMENTS

| | | |
|---|---|---|
| GB | 2348633 A | 10/2000 |
| WO | WO-99/67080 A1 | 12/1999 |
| WO | WO-2008/155129 A1 | 12/2008 |
| WO | WO-2009/040129 A2 | 4/2009 |

OTHER PUBLICATIONS

Statement of Grounds and Particulars in Opposition against Australian Patent Application No. 2010335202 dated Jun. 5, 2014.
Statement of Case in Opposition against New Zealand Patent Application No. 601309.
Declaration by Dr. Rahul Gupta dated Sep. 3, 2014.
Declaration by Wim Surma dated Sep. 1, 2014.
Technical Data Sheet Dowlex 2045S (Mar. 2008).
Technical Data Sheet Dowlex SL 2103G (Aug. 2005).
Technical Data Sheet ExxonMobil LL 1001 Series (Mar. 2007).
Technical Data Sheet of Clearflex H&T LFH 208 (Jun. 2006).
Provisional Product Data Sheet for Sumitomo Polyethylene FS150A (Jan. 1, 2008).
Product Leaflet "Silawrap ENDURO, ITW Crop Packaging Systems."
AS 1145.3-2001 (Australian Standard) "Determination of tensile properties of plastics materials; Part 3: Test conditions for films and sheets," (Feb. 27, 2001).
ISO 527-3:1995(E) (International Organization for Standardization) "Plastics—Determination of tensile properties—Part 3: Test conditions for films and sheets," (Aug. 1, 1995).
ASTM D 882-97 (American Society for Testing and Materials) "Standard Test Method for Tensile Propoerties of Thin Plastic Sheeting," (Apr. 1998).
EN 14932 (European Committee for Standardization) "European Standard: Plastics—Stretch thermoplastic films for wrapping bales—Requirements and test methods," (Dec. 2006).
SPCR 063 (SP Technical Research Institute of Sweden) "Certification rules for P-marking of Agri-stretch film for round-bale ensiling," (Feb. 2008).
Product Sheet "Use of Indopol Polybutenes in Tackified Polyethylene Films." (Jul. 2001).
McNally, G.M. et al. "The Effect of PIB Molecular Weight on the Cling Characteristics of Polyethylene—PIB Films for Stretch and Cling Film Applications." *Journal of Plastic Film & Sheeting*, vol. 21 (Jan. 2005).
Third Party Observations filed against European Patent Application 10795684.9, dated Nov. 22, 2013.
Annex 5 of Third Party Observations filed against European Patent Application 10795684.9, referred to in p. 7, lines 4-29, of Third Party Observations, dated Nov. 22, 2013.
Annex 6 of Third Party Observations filed against European Patent Application 10795684.9, referred to in p. 7. lines 4-29, of Third Party Observations, dated Nov. 22, 2013.
ASTM D882-12 "Standard Test Method for Tensile Properties of Thin Plastic Sheeting." (Sep. 2012).
Extended European Search Report issued in Application No. 14164586.1 and dated Feb. 2, 2015.
PlasticsEurope, Linear low density polyethylene (LLDPE), Nov. 2008.
http://www.plasticeurope.org/about-us.aspx; 2016.
European Office Action dated Jun. 3, 2013 issued in corresponding European Application No. 10795684.9.
International Search Report PCT/ISA/210.
Written Opinion PCT/ISA/237.

* cited by examiner

NET REPLACEMENT FILM

CROSS-REFERENCE TO RELATED APPLICATIONS

This application is a divisional under 35 U.S.C. § 121 of U.S. application Ser. No. 13/516,095, which has a 371(c) date of Aug. 23, 2012 and is a national phase under 35 U.S.C. § 371 of International Application No. PCT/EP2010/070135, filed Dec. 17, 2010, which claims priority under 35 U.S.C. § 119 to EP Application No. 09180184.5, filed Dec. 21, 2009, the entire contents of each of which are hereby incorporated by reference.

TECHNICAL FIELD

The present invention relates to prestretched films for baling of bulk material, and to methods of producing such films.

BACKGROUND OF THE INVENTION

Conventional baling of agricultural bulk products, such as grass, hay, silage or straw comprises compressing the product in the baling chamber of a baling apparatus to form a round bale and subsequently wrapping a net around the bale in order to retain the compressed shape, or at least to allow only little expansion, when the bale leaves the baling chamber. For the production of silage, which requires anaerobic conditions, a protective wrapping film is then applied around the compressed and netted bale. The protective film should provide a barrier against moisture, oxygen and UV light.

However, the use of a net for retaining the shape of the bale has several drawbacks. The net, which is generally made of high density polyethylene or polypropylene ribbons, is difficult to cut open when silage is to be extracted from the bale. The net also easily entangles with the silage. For these reasons, the used netting is difficult to recycle, especially since it must be sorted from the protective wrapping film, which is generally made of linear low density polyethylene. In view of these disadvantages, it has been suggested to replace the net with a film in order to improve the protection of the bale, facilitate the handling and/or to facilitate recycling of the material. However, conventional protective wrapping films cannot be used for this purpose since these films in general are not stiff enough to be able to substantially retain the compressed shape of the bale, but allow too much expansion of the compressed material. Furthermore, when such films are stretched before being applied on a bale, a necking or constriction is obtained, i.e. a narrowing of the film width, which may result in the film not covering the bale as desired. If a net replacement film does not cover the entire width of a round bale, the compressed product will expand at the edges of the bale, resulting in permanently weak areas at the edges when the bale is subsequently wrapped with protective wrapping film. Such areas are susceptible of mechanical damage, such as puncturing of the protective film, which may compromise its barrier function such that oxygen and moisture can penetrate into the silage. As a result, the storage stability and the nutritional quality of the silage product is reduced. Furthermore, expansion of the compressed material at the edges also causes the formation of wedge-shaped air pockets near the edges of the bale when subsequently wrapped with protective film, resulting in the retention of moisture and oxygen in the bale.

WO 2008/155129 is concerned with the above disadvantages and suggests a net replacement film, which is a pre-stretched film which has been stretched in the longitudinal direction to at least 60% of its elongation percentage at break, so that in the longitudinal direction the film only has an elongation capability of maximum 180% left. The object of WO 2008/155129 is to provide a film by means of which a compact bale, covered over the total width, can be formed. However, the film of WO 2008/155129 suffers from the drawback that it has very great stiffness in the longitudinal direction. When such a film is stretched further, e.g. before application around a bale, the film becomes even stiffer and is very susceptible of mechanical damage. If the film is punctured or tears, the tear may spread rapidly over the entire width of the film, increasing the risk for exposure of the content of the bale to moisture and oxygen. Furthermore, if such a net replacement film is severely torn, it could affect the shape of the bale or even lead to collapse of the bale. Hence, while the film of WO 2008/155129 may acceptably resist the expansive force of a compressed bale, it is susceptible to tearing, and therefore cannot even be used in baling applications requiring higher degree of stretching before application around the bale.

Hence, there remains a need in the art for improved silage baling methods and films used for this purpose.

SUMMARY OF THE INVENTION

It is an object of the present invention to at least partly overcome the above problems and to provide an improved net replacement film and a method of using such a film in the baling of compressed bulk material. In particular it is an object of the invention to provide a net replacement film which increases the efficiency and the economics in the baling process, by allowing faster baling, use of a smaller amount of protective wrapping film and/or improved protection of the product e.g. to ensure high nutritional quality in the case of silage.

These and other objects are achieved by a film according to the present invention.

In a first aspect, the invention relates to a prestretched polyethylene film having a longitudinal stretch ratio of from about 1:2 to about 1:4, preferably 1:2 to 1:3, and more preferably about 1:2.5, and having a longitudinal elongation capability of at least 170%, preferably at least 190%, more preferably at least 195% and even more preferably at least 200%, said elongation capability comprising an elastic component.

The prestretched film according to the invention exhibits a balance between elongation capability and necking which makes it excellent for use in wrapping of compressed bulk material, in particular grass for silage production. When the prestretched film is further stretched in the baler, only a small necking occurs and thus a film having a standard width fitting in the baler may still cover the width of the compressed bale to a satisfactory degree. By well covering the entire width of the bale, the formation of detrimental air pockets adjacent the edges of the bale can be reduced or completely avoided. Hence, the resistance to puncturing is improved and the moisture and oxygen contents in the wrapped bale are reduced. Also, the net replacement film allows the carbon dioxide content inside the bale to increase more quickly, which may effectively prevent growth of undesirable microorganisms.

Furthermore, it has surprisingly been found that the net replacement film according to the invention is capable of significantly reducing the volume of a bale around which it is applied, compared to the volume of a bale wrapped with a conventional net. The net replacement film may be capable of completely retaining the shape and volume of the bale formed by the baler, i.e. of preventing any expansion of the compressed material when the baling chamber is opened. It has been found that the net replacement film is capable of at least preventing expansion of the bale such that a bale wrapped with the net replacement film according to the invention has a volume which is reduced by up to 17% compared to the volume of a conventional netted bale. Because of the reduced volume, a lesser amount of protective wrapping film is required per bale, and the time required for wrapping each bale may be shortened. Hence, the net replacement film according to the invention allows saving both time and material, thus increasing the efficiency and the yield (number of bales per film roll and time unit) of the baling/wrapping process.

Said reduction in volume by the net replacement film compared to a conventional net is due to a reduction in the air volume content of the bale. Hence, not only does the volume reduction improve the efficiency and yield of the baling process, but it also reduces the oxygen content in the bale, thus providing improved conditions for the production of high quality silage.

In embodiments of the invention the prestretched film comprises linear low density polyethylene (LLDPE), typically at a content in the range of 60-99.9% by weight, preferably 70-96% by weight and more preferably 90-96% by weight. Furthermore, the film typically also comprises low density polyethylene (LDPE), preferably at a content in the range of 0.1-20% by weight, and more preferably 2.5-10% by weight.

In embodiments of the invention, the prestretched film may further comprise a tackifying agent. Typically, the content of tackifying agent is high enough for the film to cling to itself. Hence, by clinging to itself in areas of overlapping layers, the film requires no other means for attaching to the compressed material around which it is applied.

In embodiments of the invention, the prestretched film may have a thickness in the range of 5-40 micrometers, typically 10-30 micrometers and preferably 15-30 micrometers.

In a second aspect, the invention relates to a method for producing a prestretched polyethylene film as described above, comprising producing a precursor polyethylene film, stretching said precursor film to a stretch ratio of from about 1:2 to about 1:4, to form a prestretched film, and collecting said prestretched film. Typically, the precursor film is stretched to a stretch ratio of from 1:2 to 1:3, for example about 1:2.5.

In another aspect, the invention relates to the use of the prestretched film as described above for wrapping a bale of compressed bulk material, such as an agricultural bale, wherein the film is applied in direct contact with the compressed bulk material.

In another aspect, the invention relates to a method for wrapping compressed bulk material, comprising the steps of:
 (a) compressing bulk material in a chamber to form a bale of compressed bulk material;
 (b) further stretching the prestretched film as described above to a stretch ratio of from 1:1.02 to 1:2.5 relative to the length of the prestretched film;
 (c) applying said film under tension around said bale, in direct contact with the compressed bulk material; and
 (d) wrapping said film under tension at least 1.5 turns around said bale, wherein substantially no expansion of the bale of compressed bulk material occurs when the bale is removed from the chamber.

As mentioned above, the use of a film instead of a net facilitates the handling of the bale by the user and the recycling of the protective wrapping applied outside the net replacement film. Also, the risk of penetration of moisture and oxygen into the bale is reduced. Since the prestretched film experiences only a very small necking in step (b), the film may still cover the compressed bulk material to a satisfactory degree. By covering the entire width of the compressed bulk material, the formation of detrimental air pockets adjacent the edges of the bale when subsequently wrapped can be reduced or completely avoided. Hence, the resistance to puncturing is improved, and the moisture and oxygen contents in the bale are reduced.

When applied on a round bale, the protective wrapping film is generally applied such that several layers of film are required in order to cover the entire bale. As a consequence, moisture and oxygen may penetrate between adjacent layers of protective film. According to the present invention however, since the net replacement film of the invention provides a second barrier, the number of layers of protective wrapping film required to achieve a sufficient barrier to moisture and oxygen is reduced. Hence, the use of a net replacement film may shorten the subsequent wrapping process and save protective wrapping film. A less time-consuming and/or film-consuming wrapping process is highly desirable for economic reasons.

Furthermore, importantly, it has been found that the above method may significantly reduce the volume of the compressed bulk material, compared to the volume of a bale wrapped with a conventional net. By using the method according to the invention the shape and volume of the bale formed by the baler may be substantially retained, i.e. any expansion of the compressed material when the baler is opened may be prevented. It has been found that the method according to the invention allows preventing expansion of the bale such that a bale wrapped with the net replacement film has a volume which is reduced by up to 17% compared to the volume of a conventional netted bale.

Because of the reduced volume, a smaller amount of protective wrapping film is required per bale, and the time required for wrapping each bale may be shortened. Hence, the baling method according to the invention allows saving both time and material, thus increasing the efficiency and the yield (number of bales per film roll and time unit) of the baling/wrapping process.

Said reduction in volume is due to a reduction in the air volume content of the bale. Hence, not only does the volume reduction improve the efficiency and yield of the baling process, but it also reduces the oxygen content in the bale, thus providing improved conditions for the production of high quality silage.

In embodiments of the invention, the film allows up to 1% expansion of the bale of compressed bulk material when the bale is removed from the chamber, compared to the theoretical volume of the bale in the chamber, In embodiments of the invention, a further compression of the compressed bulk material may be achieved by the film, compared to the theoretical dimensions of the baling chamber.

In the case of a round bale, since the number of layers of protective wrapping film generally is smaller near the edges of the side surfaces of a round bale than centrally on the side surfaces, a conventional round bale is less well protected near the edges of its side surfaces. However, in embodiments of the present invention, where the bale of compressed bulk material is a round bale having an envelope surface and two side surfaces, the film in step (b) may be applied on the envelope surface of the bale along its circumference and such that the film extends over an edge of said envelope surface to cover part of at least one of the side surfaces of the bale. In this way, the side surfaces of the round bale are enforced near the edges of the bale, providing improved mechanical protection as well as an improved barrier to moisture and oxygen.

In embodiments of the invention, a single layer of the net replacement film may cover the entire width of the envelope surface.

Since the baler is typically standing still while the bulk material is wrapped in the baling chamber, the number of layers applied around each bale affects the time expenditure per bale produced. For reasons of economy, it is desirable to reduce the amount of time required for wrapping each bale. Therefore, there is an incentive to keep the number of layers of net replacement film as low as possible. However, more layers of net replacement film may improve both the protective barrier and the shape retention or compression achieved using the net replacement film of the invention. The present inventors have found that the application of 2-10 layers may desirably balance the requirements for quality, yield and efficiency in the baling/wrapping process. Within this range, the application of fewer layers may increase the speed of the baling process, whereas the application of more layers may improve the protection of the bale and also improve the shape retention or compression obtained and hence reduce the number of layers of protective wrapping film required in a subsequent wrapping process. Hence, the user may choose the number of layers of net replacement film within the range of 2-10 to best suit his needs and wishes. In general, 3-5 layers of net replacement film may be preferred. Furthermore, the number of layers of protective wrapping film applied outside the net replacement film may be adapted to either to provide optimal protection for the production of high quality silage, or to increase the efficiency of the baling/wrapping process, or to balance these two as desired.

DETAILED DESCRIPTION OF THE INVENTION

The present inventors have surprisingly found that a prestretched polyethylene film having a longitudinal stretch ratio of from about 1:2 to about 1:4 and having a remaining longitudinal elongation capability of at least 170%, comprising an elastic component, is capable of further compressing an agricultural bale when applied as a net replacement film.

By "stretching" is meant stretching the film in the longitudinal direction by applying tensile force. Typically stretching is achieved by passing the film between a pair of rollers, in which one roller rotates at a higher speed than the other.

As used herein, the term "stretch ratio" means the ratio of the total film length before stretching to the total film length after stretching. Thus, a stretch ratio of 1:1.5 means that the film has been stretched by 50% of its length before said stretching.

In general, when a polymeric film (for example a polyethylene based film such as those used for wrapping of agricultural products) is stretched, the deformation may be elastic, i.e. reversible, and/or plastic, i.e. non-reversible. Initially, stretching results in completely elastic deformation, such that the film recovers its original shape when the tensile stress is released. However, at a certain degree of stretching (tensile force applied), the deformation becomes partly plastic, meaning that the polymeric material can no longer completely retain its original shape, due to molecular dislocations in the polymeric structure. Thus, the film is partly irreversibly stretched. This non-elastic property is utilized for permanently reducing the thickness of cast or blown films. The stretch level at which a polymeric film begins to undergo plastic deformation is called "yield strength" or "yield point" (in a stress-strain curve) and is dependent on the material.

Figure 4:
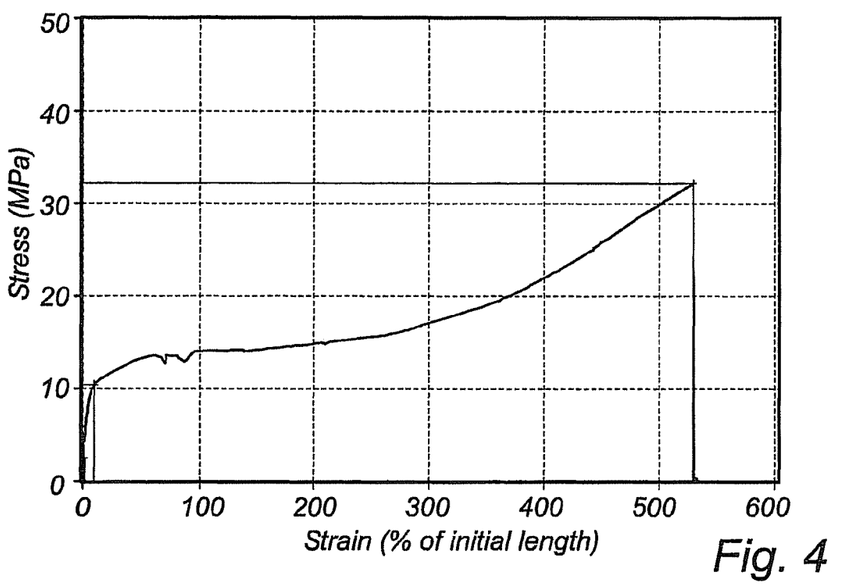
FIG. 4 shows a stress-strain curve of a polymeric film conventionally used as a balewrap.

An example of a stress-strain curve is shown in FIG. 4. This curve shows the stress-strain relationship for a polymeric film of 25 μm thickness composed mainly of linear low-density polyethylene (LLDPE) and with minor amounts of low-density polyethylene (LDPE), representing a standard balewrap used for protective wrapping of agricultural bales, which has not been subjected to prior stretching. As can be seen, at a tensile stress of slightly above 10 MPa, corresponding to an elongation of about 10%, the curve starts to flatten out, representing the yield point.

Also above the yield point, the deformation of the film material is still partly elastic. Hence, the deformation occurring above the yield point has an elastic component and a plastic component. However, the more a polymeric material is stretched, the smaller is the elastic component, and the more a polymeric film is stretched above the yield point, the more stiff it becomes. Eventually, if stretching is continued, the film breaks, as can be seen in FIG. 4 at a tensile stress of about 32 MPa (elongation of about 530%).

Figure 5:
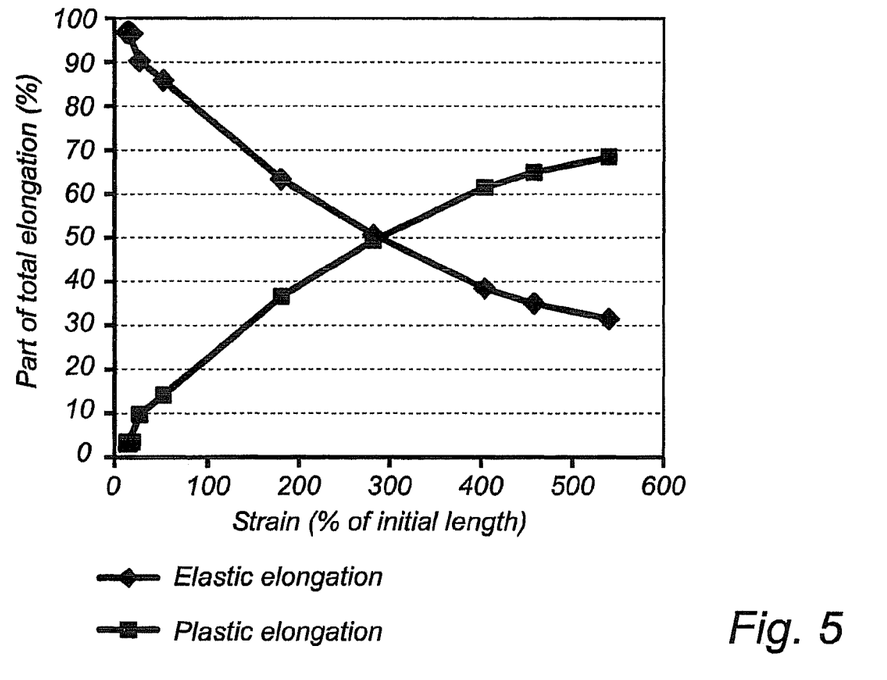
FIG. 5 is a graph illustrating the relationship between elastic and plastic deformation upon stretching of polymeric films strips.

FIG. 5 illustrates the relationship between elastic and plastic deformation upon stretching of films strips of similar composition as for FIG. 4. The test was performed on plastic strips of the same film material as in FIG. 4, having a width of 15 mm. Each strip was stretched to a certain tensile stress and the elongation between two predetermined points on the strip was measured. Next, the stress was released, allowing the strip to relax, and the elongation between the predetermined marks was measured again, the difference between the first measurement and the second measurement representing the elastic deformation. As can be seen in FIG. 5, at low stretch levels the deformation is almost entirely elastic. At a stretch level of 100%, the elastic component represents more than 75% and the plastic component represents less than 25%. At 300% stretching however, the elastic and plastic deformation are responsible for 50% each of the deformation. At about 550% stretching, just before the film breaks, the elastic component is only 30% of the total deformation.

Figure 6:
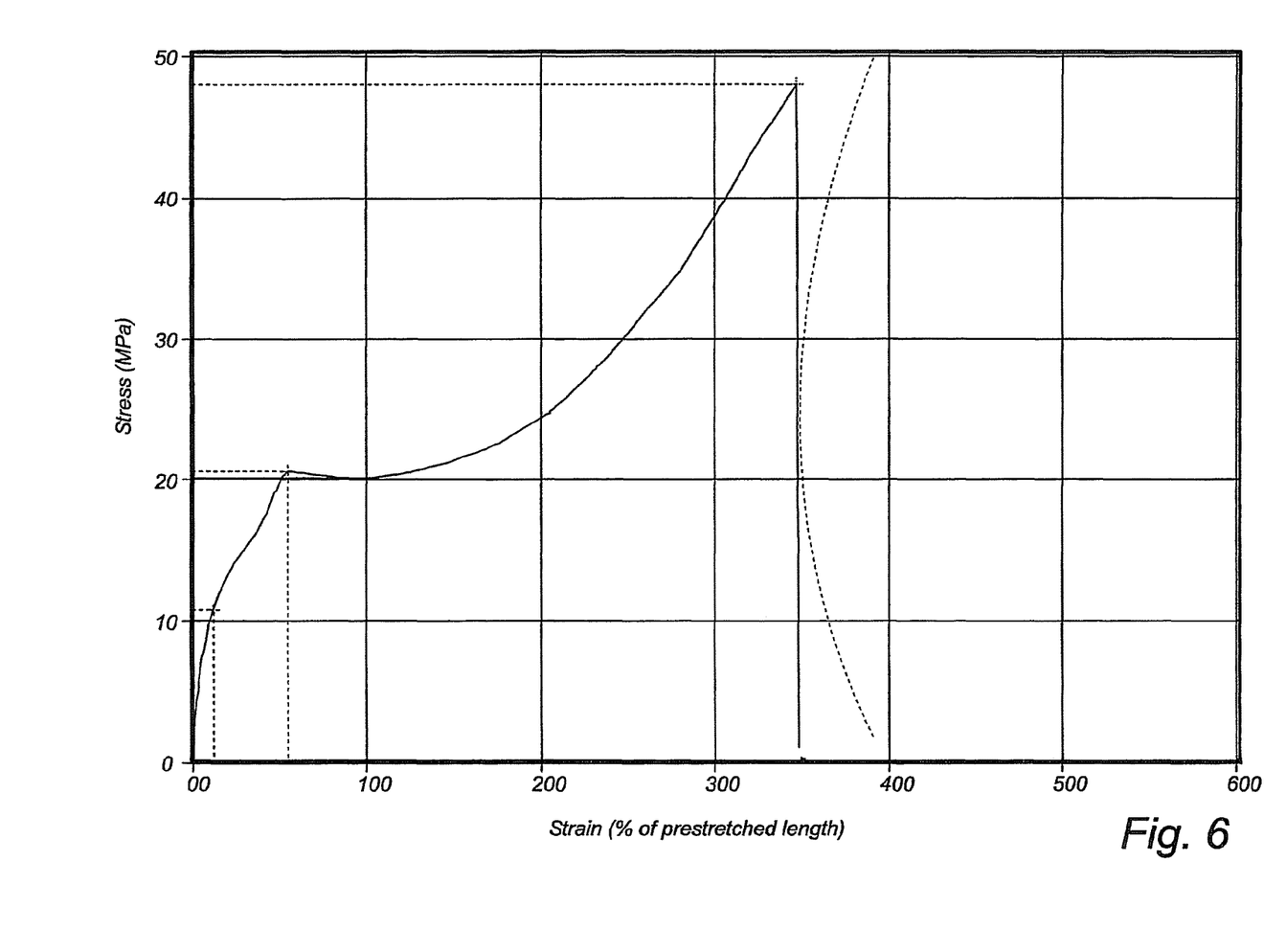
FIG. 6 shows a stress-strain curve of a prestretched polymeric film.

As used herein, "pre-stretched" means that the film has been stretched at least once during its production, and thus is stretched already before being put to use e.g. in a baler or wrapper (where it is further stretched). A prestretched film behaves differently when subjected to further stretching compared to a non-prestretched film. FIG. 6 shows the stress-strain curve of a polymeric film of the same composition as the film of FIG. 4, but which was prestretched, thereby reducing the thickness to about 19 micrometers. For all practical purposes, the yield point of this prestretched film is slightly above 20 MPa.

As mentioned above, the film disclosed in WO 2008/155129 is produced by stretching the film in the longitudinal direction to at least 60% of its elongation at break, so that the film only has an elongation capability of maximum 180% left. The pre-stretched film of WO 2008/155129 therefore has low elasticity and very great stiffness in the longitudinal direction. When such a film is stretched further, e.g. before application around a bale, the film becomes even stiffer and is very susceptible of mechanical damage. If the film is punctured or tears, the tear may spread rapidly over the entire width of the film, increasing the risk for exposure of the content of the bale to moisture and oxygen. Furthermore, if a net replacement film is severely torn, it could affect the shape of the bale or even lead to collapse of the bale.

As described above, the purpose of the conventional net applied around the bale after compression, as well as that of known net replacement films, is to retain the compressed shape of the bale as much as possible, typically allowing a small degree of expansion (e.g. 5%). The film of the present invention, however, can be further stretched before being applied onto the bale, this stretching resulting in both elastic and plastic deformation, and when subsequently wrapped tightly around the bale, the film exerts force(s) on the bale so as to at least substantially prevent any expansion of the bale. In this way the total volume of the bale has been found to be reduced by up to 17%, and the air volume content to be reduced by 10-34%, compared to the total volume and the air content, respectively, of a conventional netted bale.

A polymeric film which has undergone only little stretching may still have a relatively large capacity for elastic deformation upon further stretching, whereas a film that has been stretched to a high degree may have only little capacity left for elastic deformation, i.e. any remaining deformation will be substantially plastic. Thus, not all polymeric films have the same capacity for elastic deformation of elastic deformation, since this property is dependent on the degree of prior stretching to which the film has been subjected. For example, the pre-stretched film of WO 2008/155129 has a high level of pre-stretching, leaving only little capacity for further elastic deformation.

Furthermore, a polyethylene film which has been subjected to a high degree of stretching is stiff and susceptible of mechanical damage (puncturing, splitting). If the film of WO 2008/155129, for example, is stretched only a little too much in the baler it may break, requiring re-application or change of film roll which is time-consuming and therefore highly undesirable.

On the other hand, a polyethylene film which has been subjected to a low degree of stretching (or no prior stretching at all) may upon further stretching experience necking, meaning that the width of the film is reduced while the film is stretched.

As used herein, the expression "elongation capability" means the capability of a film of elongating by stretching without breaking or rupturing. A film which can be stretched by an additional 200% of its length consequently has an elongation capability of at least 200%.

As used herein, the expression "elongation capability comprising an elastic component" means that upon subsequent stretching, part of the resulting elongation is an elastic deformation. Thus, when the prestretched film according to the invention is stretched subsequently, part of the resulting elongation is reversible. As a result, when the film is relaxed, tightly wrapped around the bale, the film while partially returning to its original prestretched length may exert a compressive force on the bale.

The film according to the present invention has a degree of pre-stretching which allows further stretching of up to 100% of the pre-stretched length, or even up to 115% or even 130%, while retaining an elastic component within this range. This is achieved by a pre-stretched film having a longitudinal stretch ratio of from about 1:2 to about 1:4, and having, as a result of this stretch level, a remaining longitudinal elongation capability of at least 170%, wherein said elongation capability comprises an elastic component, i.e. is partly reversible.

As used herein, the expression "first contact layer" means that the film is applied in direct contact with the compressed bulk material and that no other film or layer is applied between the compressed bulk material and the prestretched film according to the invention.

As used herein the expression "substantially no expansion of the compressed bulk material" means that the volume of the wrapped, compressed bale of bulk material is not substantially larger than the theoretical volume of a bale in the baling chamber. Furthermore, "substantially" used in this context means a deviation (i.e., increase) of up to about 1%, for example 0.8% or less, from the theoretical volume of the bale. In contrast, a conventional netted bale has been found to expand up to 5-6% by volume after leaving the baling chamber, compared to the theoretical volume of the bale in the baling chamber.

The prestretched film of the present invention may be produced by blown film extrusion to form a precursor film which is stretched in-line or off-line to form a prestretched film. Alternatively, the precursor film may be produced by cast film extrusion.

Figure 1:
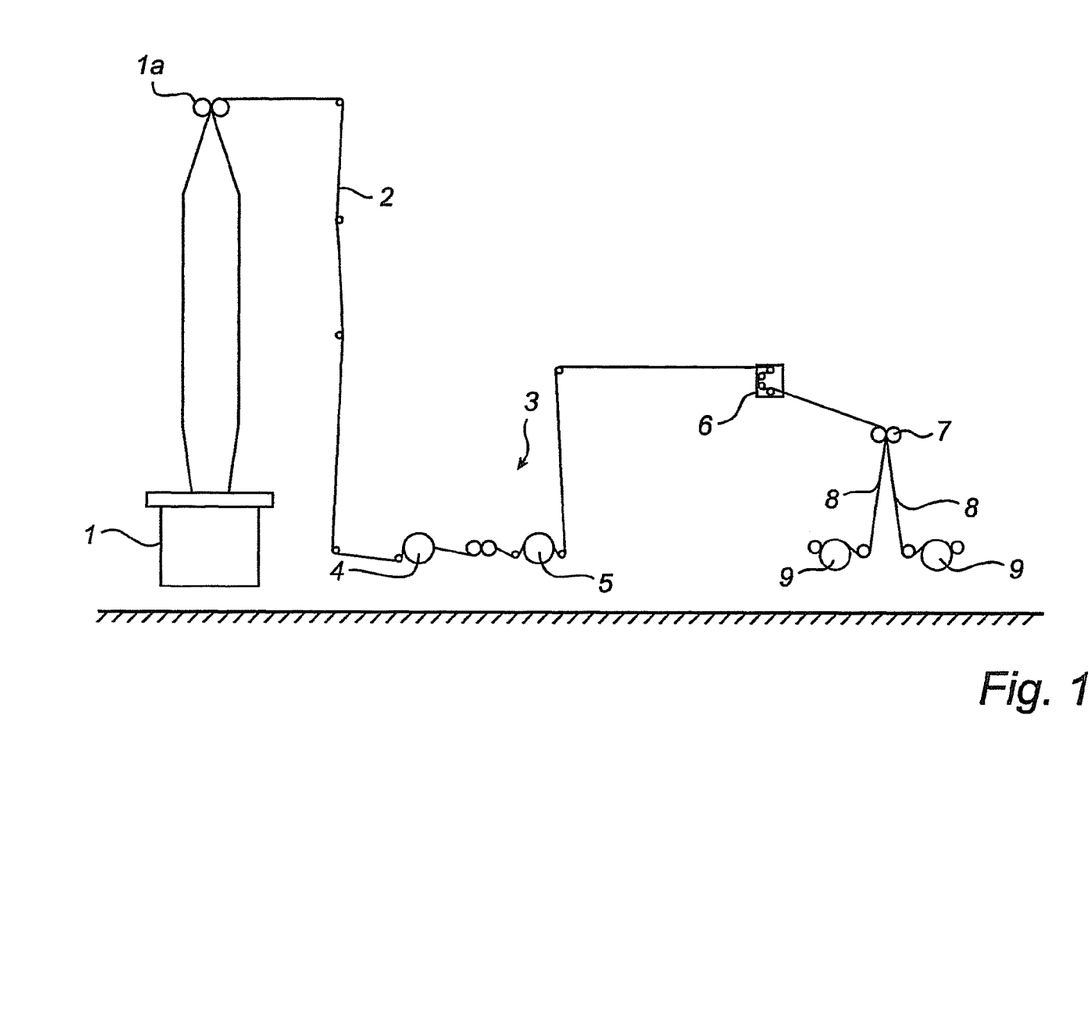
FIG. 1 is a schematic illustration of a method for producing a prestretched film of the invention.

FIG. 1 illustrates a method of producing the prestretched film according to the invention. A mono- or co-extruded blown film is produced that is advanced through primary nip rollers 1a. The nip roller nips together the blown film. From the primary nip rollers the plastic tubular film 2 is passed via guide rollers to the stretch unit 3, where stretching is performed between two rollers, first draw roller 4 and second draw roller 5, having different speeds. After being stretched in the stretch unit 3, the tubular film is passed to a dividing station 6 where the edges of the film 2 may be cut to provide two individual sheet of film. Next, the film 2 is passed to the secondary nip rollers 7 where the individual sheets of film 8 may be separated. Each film sheet 8 may optionally pass through a second dividing station (not shown) where the sheet may be divided longitudinally into two or more parallel sections. Finally, the film sheets, or film sheet sections, are wound onto the winders 9. In embodiments of the invention where the edges of the tubular film are not cut in the dividing station 6, the tubular film is typically wound onto one of the winders 9.

The prestretched film according to the invention has a stretch ratio in the range of 1:2 to 1:4, meaning that the film is stretched, typically in the stretch unit 3, by about 100% to about 300% of its original length before stretching (that is, the prestretched film has a total length after stretching which is from 200% to 400% compared to its original length). For example, the prestretched film may have a stretch ratio of about 1:2.5.

In order to achieve the above stretch ratios, the film may be stretched and subsequently relaxed. For example, the precursor film may be stretched by 180% of its length and then partially relaxed to provide a prestretched film having a stretch ratio of 1:2.5 (stretched by 150%). Hence, as used herein, the stretch ratio of the prestretched film refers to the stretch ratio of the resulting, optionally relaxed film, and not necessarily to the maximum degree of stretching experienced by the film. The stretching is typically conducted at a temperature in the range of 20° C. to 70° C.

The prestretched film has a remaining elongation capability, in relation to its prestretched length, of at least 170%, for example at least 180% or at least 190%. Thus, the prestretched film may be additionally stretched by at least 170% of its prestretched length. The remaining elongation capability is dependent on the film material and the stretch ratio of the prestretched film. Typically, for a film according to the invention, the elongation capability includes both an elastic and a plastic (irreversible) component. Thus, upon further stretching and relaxation of the prestretched film, part of the elongation achieved during the further stretching is reversed during relaxation and the film thus obtains a final length in the range between the first prestretched length and the maximum length during the further stretching step.

The prestretched film typically has a thickness in the range of 5-40 micrometers, such as 10-30 micrometers. In preferred embodiments of the invention, the prestretched film may have a thickness in the range of 15-30 micrometers. Using a thickness in this range, the compressive effect on the bale may be achieved using only a few layers of the prestretched film.

The composition of the prestretched film comprises at least one polyethylene, typically linear low density polyethylene (LLDPE). In embodiments of the invention the invention, the film may comprise LLDPE and also low density polyethylene (LDPE). Both these polymers are well known to persons skilled in the art. The LDPE content typically gives more uniform stretching and also provides adhesive properties. According to the present invention, the content of LLDPE may be in the range of 60-99.9% by weight, preferably 70-96% by weight, more preferably 90-96% and the content of LDPE may be in the range of 0.1-20% by weight, preferably 2.5-10% by weight.

The prestretched film may further comprise a tackifying agent. The tackifying agent provides cling properties to the film such that the film clings to itself, e.g. when applied as several layers around an object. Thus, the prestretched film can be secured when applied more than a full turn around an object such as a bale of compressed bulk material, even if the film would not particularly cling to the object itself. The tackifying agent may be fixed on the surface of the film or migrating in the film.

Examples of tackifying agent include polyisobutene (PIB), copolymers of ethylene vinyl alcohol (EVA), very linear low density polyethylene (VLLDPE), ultra linear low density polyethylene (ULLDPE), and combinations thereof. The content of tackifying agent may generally be in the range of 0.1-10% by weight, and may depend on the type of tackifying agent(s) used. For example, if only PIB is used as the tackifying agent, the PIB content may be in the range of 2-10% and typically 4-7% by weight. As another example, combining PIB and EVA as tackifying agents, the vinyl alcohol content may be in the range of 0.1-6% and typically 0.5-4% by weight, and the PIB content may be in the range of 0.1-6%, preferably 1-4% by weight. The content of tackifying agent in the prestretched film is preferably high enough to provide tack properties so that the film adheres to itself under normal outdoor conditions.

The prestretched film may further comprise conventional additives such as pigments and/or UV stabilisers.

The prestretched film according to the invention may be used as a first contact layer for wrapping compressed bulk material.

Figure 2:
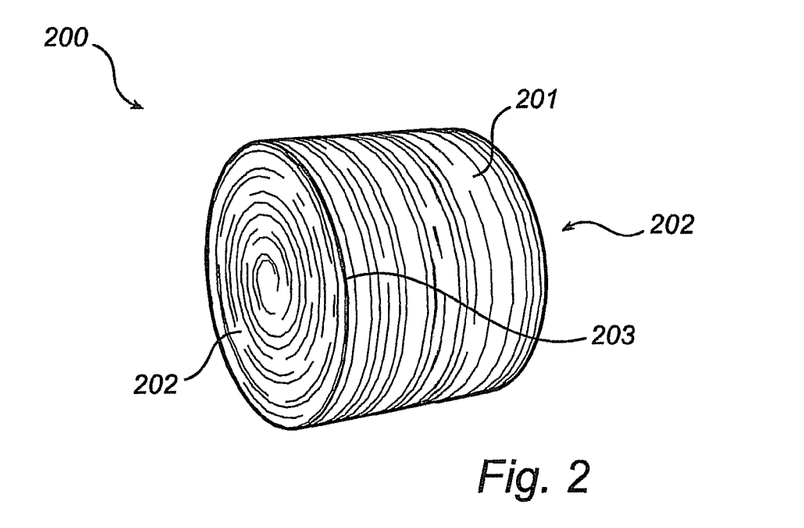
FIG. 2 is a perspective view of a round bale illustrating the shape and features referred to in the description of the present invention.

FIG. 2 illustrates a typical agricultural round bale, e.g. for silage production. The bale 200, having been compressed in the baling chamber of the baler (not shown), has a generally cylindrical shape comprising an envelope surface 201 and two side surfaces 202.

When used in a baling process, the prestretched film according to the invention is typically provided in the form of a film roll mounted in the baler used for the baling, and is dispensed from the roll via film dispensing means to a second stretch unit also provided in the baler. In the second stretch unit the film is subjected to a second stretching, effected in one or more stretching steps. In the second stretch unit the prestretched film may be stretched longitudinally by 2-150% relative to its prestretched length, corresponding to a stretch ratio of from 1:1.02 to 1:2.5. After the second stretching, the film is applied under tension on the bale, still within the baling chamber. Balers provided with means for holding a film roll, film dispensing means and a stretch unit are known in the art and may be employed in a method according to the present invention.

The baling method described herein may reduce the volume of the bale of compressed material by up to 17% compared to the volume of a bale wrapped with conventional net. It is even possible that the net replacement film may achieve a further compression of the bale compared to its dimensions before wrapping; however, such a compression is difficult to determine since the exact actual dimensions of the compressed bale in the baling chamber are unknown and hence the inner dimensions of the chamber are used for calculating a theoretical bale volume.

During the second stretching only a small necking of the film occurs. Typically, the film constricts from 5 to 20% of its width, for example from 7 to 11%.

The film may be applied at least about 1.5 turns around the bale, i.e. such that at least about half of the envelope surface of the bale is covered by two layers of the film and the remaining part of the envelope surface of the bale is covered by a single layer of the film. By applying the film with at least half a turn of overlap between film layers, a film comprising a tackifying agent as described above adheres sufficiently firmly to itself in order to exert the force(s) necessary on the bale. The present film may also be applied more than 1.5 turns around the bale, for example, the film may be applied to provide from 2 to 10 layers of film as measured centrally on the envelope surface of the bale. Typically, from 3 to 5 layers of film are applied around the bale.

If the film does not contain a tackifying agent, the film must be attached by other means when applied on the bale. Examples of such means include tape strips and adhesive, which can be applied on the film, e.g. in the area of overlapping layers, in order for the subsequent film layer to adhere to the preceding film layer The present film is typically applied on the bale as a first contact layer, that is, the first layer of film is applied directly onto the bulk material. Typically, no netting is applied around the bale before applying the present film. Hence, the present film can be used for replacing the net, thus avoiding many drawbacks of conventional baling methods, while also offering the new advantage of reducing the volume of the bale.

When the desired number of layers of film have been applied, the film is cut and, if necessary, attached to the subsequent layer and then the wrapped bale is ejected from the baling chamber.

Figure 3:
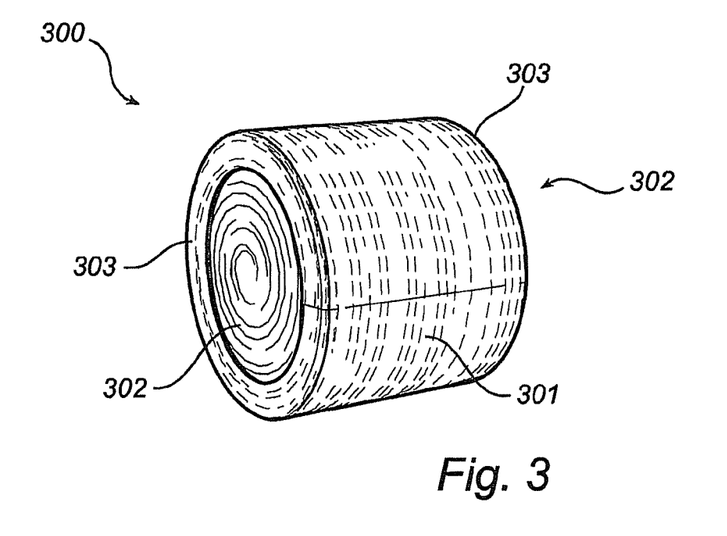
FIG. 3 is a perspective view of a round bale wrapped with a net replacement film according to the invention.

FIG. 3 illustrates the round bale of FIG. 2 wrapped with the film according to the invention. As can be seen in this figure, the film has been applied such that part of the film extends over the edges 303, 303' of the bale. Applying the film over the edges of the bale reduces the risk for puncturing and avoids the formation of air pockets underneath the wrapping.

Because of the small degree of necking, the film may be wider than the width of the bale (length of the envelope surface) even after the second stretching, so that when applied on the bale the film simultaneously may extend over both edges 303, 303' and thus by a single layer of film cover part of the side areas 302, 302' of the bale.

Thus, in embodiments of the invention, the film may be wide enough when applied on the bale to cover by a single layer the entire width of the bale (length of the envelope surface 201) of the bale, and preferably such that it also extends over both edges of the bale. Thus, maximum coverage of the bale, and therefore maximum compressive force by the film, may be achieved using the fewest layers of film.

In alternative embodiments the film may have a width which is equal to or even smaller than the length of the bale envelope surface.

In embodiments of the invention, the film, which may optionally be wider than the width of the bale after the second stretching, may be shifted relative to the bale in the direction transverse to the film feeding direction (i.e., shifted sideways along the width of the bale) such that a first layer of film extends over the edge 303 (but not edge 303') and covers part of the side surface 302 (but side surface 302') while a subsequent layer instead extends over the edge 303' and covers part of the side surface 302'.

In yet alternative embodiments of the invention, when the film has a width which is equal to or even smaller than the length of the bale envelope surface 201, it may be advantageous to wrap the bale using two rolls of the film of the invention by applying the film from the first roll such that it covers part of the envelope surface and extends over the edge 303 and cover part of the side surface 302, and subsequently or simultaneously applying the film from the other roll such that it covers the part of envelope surface not covered by the film from the first roll and partly overlaps the first film, and extends over the edge 303' of the bale and covers part of the side surface 302'.

The round bale wrapped with the net replacement film of the invention may be subsequently wrapped with a conventional protective film as described above.

EXAMPLES

Three films according to different embodiments of the invention were produced as described below. One of these films was used for a comparative baling test.

Film 1

A mono extruded net replacement film (Film 1) according to the invention was produced by blow film extrusion and prestretched to a stretch ratio of 1:2.5 (prestretched by 150% of its original length). The prestretched film had a width of 1600 mm and a thickness of 20 μm. The film contained LLDPE/LDPE at a ratio of 94:6, polyisobutene (PIB) at a content of 6% by weight and a conventional UV stabiliser at a content of 2000 ppm by weight. Film 1 had a remaining elongation capability of 222%.

Film 2

A net replacement film (Film 2), having the same composition as Film 1, was produced in a manner identical to that of Film 1 except that the Film 2 was prestretched at a ratio of 1:2 (100% stretching). Film 2 had a remaining elongation capability of 291%.

Film 3

A co-extruded three-layer net replacement film (Film 3) according to the invention was produced by blow film extrusion and prestretched at a stretch ratio of 1:2.5 (prestretched by 150% of its original length). The film had a width of 1600 mm and a thickness of 20 μM. The first layer consisted of EVA and additives (see below). The total content of vinyl alcohol was 1.7% by weight, based on total film weight. The second layer was an LLDPE/LDPE mixture as described herein and the third layer was also an LLDPE/LDPE mixture as described herein. The total ratio of LLDPE:LDPE in the 3-layer film was 97:3. The second layer additionally contained white pigment ($TiO_2$) at a total content of 2.3% by weight, based on total film weight. The various layers also contained PIB and UV stabiliser at total contents of 8.9% by weight of PIB and 2900 ppm by weight of UV stabiliser, based on total film weight. Film 3 had a remaining elongation capability of 232%.

Baling Test

Film 1 (see above), having width of 1600 mm, was used as a net replacement film and compared in a baling process to a conventional edge to edge netting having a width of 1230 mm.

Twelve round bales of grass were produced by a round baler. The net replacement film according to the invention and the conventional netting was applied on six bales each. The net replacement film according to the invention was stretched in the baler at a stretch ratio of about 1:2 (about 100% further stretching) before being applied 7 turns (layers) around the bale. The net replacement film experienced a necking of 15%. All twelve bales were subsequently wrapped with 6 layers of conventional bale wrap film and measured for the calculation of bale volume.

Calculation of Bale Volumes

The bales were geometrically treated as cylinders. The circumference of each tested bale was measured centrally on the bale envelope surface, and the mean values for bales with netting or net replacement film, respectively, were calculated, setting the width of the bales (i.e. cylinder height) to 1 m.

The inner diameter of the baling chamber was 1.25 m, giving an inner circumference of 3.93 m and thus, assuming a width (cylinder height) of 1 m, a theoretical bale volume of 1.23 $m^3$.

The results are presented in Table 1.

TABLE 1

| | Circumference (mean, n = 6) | Volume (calculated) |
|---|---|---|
| Bales with netting (reference) | 4.05 m | 1.31 $m^3$ |
| Bales with net replacement film | 3.9 m | 1.21 $m^3$ |

As can be deduced from the data presented in Table 1, the bales wrapped with the net replacement film according to the present invention had an average volume which was 7.8% smaller than the average volume of bales wrapped with conventional net.

Also, the individual dimensions of the largest netted bale and the smallest bale wrapped with net replacement film according to the invention were compared. The results are presented in Table 2.

TABLE 2

|  | Circumference | Volume (calc.) |
|---|---|---|
| Largest bale with netting (reference) | 4.15 m | 1.37 m³ |
| Smallest bale with net replacement film | 3.84 m | 1.17 m³ |
| Difference | 0.31 m | 0.20 m³ |

As can be seen in Table 2, the comparison of the extremes revealed that the difference in volume between individual bales was as high as 0.20 m³, meaning a difference in volume of 17%. Furthermore, the volume of the smallest bale wrapped with the net replacement film according to an embodiment of the invention was 0.06 m³ smaller than the theoretical volume of the bale in the baler (see above), corresponding to a difference (reduction) of 5%. Thus, a further compression of the bale was obtained compared to the theoretical volume of the of the bale in the baling chamber.

Calculation of Air Volume Content

The air content of each bale was calculated. For the calculations, the following input data were used:
Weight of bale: 700 kg (assumed)
Dry content of compressed bale: 50% (assumed)
Dry matter density of compressed grass: 1450 kg/m³
Density of water: 1000 kg/m³
From the above it follows that
  volume of dry matter content per bale (350 kg)=0.24 m³
  volume of water content per bale (350 kg)=0.35 m³
The results (mean and largest difference) is presented in Tables 3 and 4, respectively.

TABLE 3

|  | Total volume (see Table 1) | Volume of air content (calc.) |
|---|---|---|
| Bales with netting (reference) (mean, n = 6) | 1.31 m³ | 0.71 m³ |
| Bales with net replacement film (mean, n = 6) | 1.21 m³ | 0.62 m³ |
| Difference |  | 0.09 m³ (15%) |

TABLE 4

|  | Total volume (see Table 1) | Volume of air content |
|---|---|---|
| Largest bale with netting (reference) | 1.37 m³ | 0.78 m³ |
| Smallest bale with net replacement film | 1.17 m³ | 0.58 m³ |
| Difference |  | 0.20 m³ (34%) |

As can be seen in Tables 3 and 4, the bales wrapped with net replacement film according to the invention had a remarkably lower air content compared to bales wrapped with conventional netting. Consequently, bales wrapped with the net replacement film are less exposed to oxygen present within the bale, irrespective of how the bale is protected on its outside.

The prestretched film of present invention, although sometimes referred to as a net replacement film, is not limited to use for wrapping silage, as is readily appreciated by a person skilled in the art. In fact, any advantages and effects obtained using the film described herein may be beneficial when the film is used for wrapping any sort of compressed bulk material, agricultural or other. For example, the prestretched film of the invention may be used for wrapping hay, pressed sugar beet pulp, various crops such as maize, corn or grain, waste matter, or material for energy recovery.

Thus, the person skilled in the art realizes that the present invention by no means is limited to the preferred embodiments described above. On the contrary, many modifications and variations are possible within the scope of the appended claims

The invention claimed is:

1. A method for wrapping a compressed bulk material, comprising:
   providing a prestretched polyethylene film having a first longitudinal stretch ratio of about 1:2 to about 1:4 and a longitudinal elongation capability of at least 190% based on a length of the prestretched polyethylene film, the longitudinal elongation capability comprising an elastic component;
   compressing a bulk material in a chamber to form a bale of the compressed bulk material;
   further stretching the prestretched polyethylene film to a second longitudinal stretch ratio of 1:1.02 to 1:2.5 relative to the length of the prestretched polyethylene film to obtain a further stretched film;
   applying the further stretched film under tension around the bale and in direct contact with the compressed bulk material; and
   wrapping the further stretched film under tension to apply 3-7 layers of the further stretched film around the bale, as measured centrally on an envelope surface of the bale to obtain a wrapped bale, wherein substantially no expansion of the wrapped bale occurs in that there is 1% or less expansion when the bale is removed from the chamber compared to a theoretical volume of the bale in the chamber.

2. The method of claim 1, wherein the compressed bulk material is further compressed by the further stretched film.

3. The method of claim 1, wherein the compressed bulk material is a round bale having an envelope surface and two side surfaces, and the further stretched film is applied to the envelope surface along its circumference such that the further stretched film extends over an edge of the envelope surface to cover part of at least one of the side surfaces.

4. The method of claim 3, wherein a single layer of the further stretched film is applied to cover an entire width of the envelope surface.

5. The method of claim 1, wherein 3-5 layers of the further stretched film are applied around the bale, as measured centrally on an envelope surface of the bale.

6. The method of claim 1, wherein the first longitudinal stretch ratio of the prestretched polyethylene film is about 1:2.5.

7. The method of claim 1, wherein the prestretched polyethylene film includes linear low density polyethylene (LLDPE) and low density polyethylene (LDPE).

8. The method of claim 7, wherein the LLDPE is present in a range of 60-99.9% by weight, and the LDPE is present in a range of 0.1-20% by weight.

9. The method of claim 1, wherein the prestretched polyethylene film has a thickness in a range of 5 to 40 micrometers.

10. The method of claim 1, wherein the compressed bulk material includes at least one of grass, hay, sugar beet pulp, maize, corn, grain, waste matter, or material for energy recovery.

11. The method of claim 1, wherein the compressed bulk material is a grass for silage production.

12. The method of claim 1, wherein the second longitudinal stretch ratio is 1:2 relative to the length of the prestretched polyethylene film.

13. A method of making silage, comprising:
providing a first film which is a prestretched polyethylene film having a longitudinal stretch ratio of about 1:2 to about 1:4 and a longitudinal elongation capability of at least 190% based on a length of the prestretched polyethylene film, the longitudinal elongation capability comprising an elastic component;
applying the first film around a bale of compressed agricultural material for silage production to obtain a wrapped bale; and
applying a second film which is a protective wrapping film around the wrapped bale.

14. The method of claim 13, wherein the compressed agricultural material is grass.

15. The method of claim 13, wherein the bale is a round bale, and the prestretched polyethylene film is applied in a circumferential direction around the bale.

16. The method of claim 13, wherein the prestretched polyethylene film is applied as a first contact layer in direct contact with the compressed agricultural material.

17. The method of claim 13, wherein the wrapped bale has a volume substantially equal to or smaller than a theoretical bale volume of a baling chamber used to form the compressed agricultural material.

18. The method of claim 13, wherein the longitudinal stretch ratio is about 1:2.5.

19. The method of claim 13, wherein the prestretched polyethylene film has a content of LLDPE in a range of 60-99.9% by weight and a content of LDPE in a range of 0.1-20% by weight.

20. The method of claim 13, wherein the prestretched polyethylene film has a thickness in a range of 10 to 30 micrometers.

21. The method of claim 13, wherein the providing includes dispensing the prestretched polyethylene film from a roll of film mounted in a baler for forming the bale of the compressed agricultural material.

* * * * *